United States Patent [19]

Reich et al.

[11] Patent Number: 4,463,496

[45] Date of Patent: Aug. 7, 1984

[54] DEEP SUBMERGENCE VEHICLE (DSV) LIGHTWEIGHT CABLE CUTTER

[75] Inventors: Ronald S. Reich; Jimmy L. Held; Arthur E. Munson; James R. Hartley, all of San Diego, Calif.

[73] Assignee: The United States of America as represented by the Secretary of the Navy, Washington, D.C.

[21] Appl. No.: 438,239

[22] Filed: Nov. 1, 1982

[51] Int. Cl.$^3$ .................. B26B 17/04; B63C 11/52
[52] U.S. Cl. .................................. 30/180; 30/92; 114/221 A
[58] Field of Search .............. 30/92, 180, 228; 114/221 A; 60/478

[56] References Cited

U.S. PATENT DOCUMENTS

| | | |
|---|---|---|
| 2,248,642 | 7/1941 | Phillips .................. 30/92 X |
| 2,711,583 | 6/1955 | Raby .................... 30/92 |
| 2,714,250 | 8/1955 | Twedt ................... 30/180 |
| 3,058,214 | 10/1962 | Mekler .................. 30/180 |
| 3,326,173 | 6/1967 | Kurtz ................... 114/221 A |
| 3,844,244 | 10/1974 | White ................... 114/221 A |
| 3,848,334 | 11/1974 | Mattera ................. 30/180 |
| 4,016,728 | 4/1977 | Mason ................... 114/221 A |
| 4,026,028 | 5/1977 | Green ................... 30/233 |
| 4,306,413 | 12/1981 | Middleton ............... 60/478 |

Primary Examiner—Jimmy C. Peters
Attorney, Agent, or Firm—R. F. Beers; Ervin F. Johnston; Edmund W. Rusche, Jr.

[57] ABSTRACT

In improved cable cutter for undersea use is presented which has a self-contained, pressure compensated hydraulic system which allows it to operate in the deep ocean. The cable cutter is designed to operate from and mate with manipulators of Navy deep submergence vehicles. The concept of this cable cutter is a closed hydraulic system which provides driving force on a piston pushing a cutting blade against an anvil. The hydraulic power is provided by an internal gear pump. The gear pump has a drive shaft which mates with the rotary output of a deep submergence vehicle manipulator. The hydraulic fluid reservoir also serves as a pressure compensator for working in the deep ocean. The hydraulic fluid system comprises a main cylinder which contains the drive piston and a secondary cylinder which consists of a flexible tube that allows fluid pressure equalization with the environment as well as volume compensation. Both cylinders are mounted between manifold components. One manifold component is rigidly connected to the cutter end of the drive piston cylinder, and the other manifold component rigidly connected to the other end of the drive piston cylinder is in contact with an assembly containing the internal gear pump.

9 Claims, 4 Drawing Figures

FIG.2. VIEW A-A.

DEEP SUBMERGENCE VEHICLE (DSV) LIGHTWEIGHT CABLE CUTTER

STATEMENT OF GOVERNMENT INTEREST

The inventon described herein may be manufactured and used by or for the Government of the United States of America for governmental purposes without the payment of any royalties thereon or therefor.

BACKGROUND OF THE INVENTION

The design and use of cable cutters to be operated in the ocean environment has become of great importance in the field of marine engineering. Cable cutters have been of extreme interest to the U.S. Navy. One major Navy application is for minesweeping operations. Operation of cable cutters is presently being extended to all depths of the world's oceans.

The design and construction of cable cutters cover an extensive area of the engineering fields. The general method used for cutting is a mechanical technique usually involving a cutter impinging on an anvil to cut the cable or wire. In some cases scissor-like devices have been used. Operation of the cable cutter has included the manipulation of the cutter at the cable by a diver, either remote or hands-on operation of a cutter which is actuated by the force of contact with the cable, and by remote means using electrical wires to actuate an explosive firing mechanism. Generally, such cable cutters have been designed as expendable in that they can only be used to cut once and are either lost or destroyed by that operation.

Originally, cable cutters were designed mostly for cutting simple wire ropes and electrical cables. Modern state-of-the-art for electrical cable construction has resulted in the use of KEVLAR as a strength member. KEVLAR is a tough synthetic fiber and cannot easily be cut by scissor mechanisms. Consequently, many new designs for various types of cable cutters have been presented during the recent years. These have generally incorporated powerful anvil/cutter blade mechanisms.

Modern cable cutting technique is also being applied to underwater deep submergence vehicles. Cutters have been designed which mount to such vehicles and can be manipulated by an operator located inside the vehicle. Cable cutters designed for use at great ocean depths have been required to be heavy and bulky in order for certain pressure sensitive components to withstand and high hydrostatic pressures. This is particularly true where hydraulic systems have been used to provide a powerful cutting force. The essence of the present invention is the presentation of an improved hydraulic cable cutter which is designed to be lightweight and to operate from, and mate with, the manipulators of a deep submergence vehicle.

SUMMARY OF THE INVENTION

The concept of this cable cutter is an improvement to a hydraulic driven piston-type cutter. The present state-of-the-art for hydraulic actuated cable cutters usually incorporates a hydraulic driven piston which pushes the cutting blade against an avil. Application of the hydraulic power to operate this type cable cutter has been applied either locally at the cutter or from some semi-remote position such as from inside a diving vehicle.

This invention is a self-contained, pressure compensated hydraulic system which allows the cutter's design to be lightweight and its operation at all depths of the ocean. Hydraulic power is provided to the cutter by an internal gear pump contained within the cutter assembly. The gear pump has a drive shaft which mates with a rotary output of a deep submergence vehicle manipulator. A pliable hydraulic fluid reservoir serves as a means to compensate the internal pressure of the hydraulic fluid with the surrounding hydrostatic pressure. It is this feature that allows for a lightweight design of the apparatus since heavy wall thicknesses are not required for resisting the hydrostatic pressures at the ocean depths.

A drive shaft from the deep submergence vehicle transmits the rotary output power necessary to drive the gears of the cable cutter's gear pump. This rotary action is reversible. One direction is used for cutting and the other direction for retracting the blade. The cutter is therefore a reusable device which overcomes a critical fault of many "state-of-the-art" underwater cable cutters which can be operated only once and thereafter abandoned.

They hydraulic system containing the fluid is a closed system composed of the internal gear pump, a main cylinder containing a drive piston, manifold components fitted at each end of the main cylinder, and a pressure compensation cylinder mounted between the end manifolds and made up of a flexible tube attached between those manifolds. The manifold at one end of the main cylinder is fitted to the internal gear pump. Holes are provided in the manifolds to allow the fluid to flow between the internal gear pump, the main cylinder, and the pressure compensating cylinder. Hydraulic fluid surrounds both sides of the piston and can force the cutter blades to open or to cut.

The pressure compensation cylinder which is made up of a flexible tube exposed to the surrounding environmental hydrostatic pressure provides the means by which the fluid within the cable cutter system is maintained at the same pressure as exists hydrostatically in the ocean about the cutter. Since there is no pressure differential acting upon the cutter housing and pump system, the cable cutter system may be constructed in a lightweight manner.

The actual cutter assembly, which is not a claim of this invention, is basically a rigid hook containing an anvil, and is attached to the cylinder portion of the cutter. A cutter blade rides along a track on the inside surface of the hook and is driven by the piston in the hydraulic cylinder. The blade can be driven to either cut a cable caught on the anvil, or to retract from the cutting position. The cutting blade is capable of cutting both wire rope and electrical cable.

OBJECTS OF THE INVENTION

An object of the invention is to provide an improved lightweight underwater cable cutter with a self-contained, pressure compensated hydraulic system which allows it use in the deep ocean.

A second object of the invention is to provide an improved, lightweight hydraulically actuated cable cutter wherein the hydraulic system is self-contained and the hydraulic forces are created by the use of an internal gear pump.

A third object of the invention is to provide an improved, lightweight hydraulically actuated cable cutter which can be operated to drive a piston pushing the cutting blade against an avil or, in the reverse, by driving a piston to pull the cutting blade away from the anvil.

A further object of the invention is to provide an improved self-contained, pressure compensated hydraulically actuated cable cutter which is powered by an attachable to a deep submergence vehicle for undersea operation.

And yet another object of the invention is to provide an improved lightweight hydraulically actuated cable cutter with an internal gear pump driven by a drive shaft from an external rotary source of power.

These and other objects of the invention will become more readily apparent from the ensuing specification when taken together with the drawings.

DESCRIPTION OF THE PREFERRED EMBODIMENT

Figure 1:
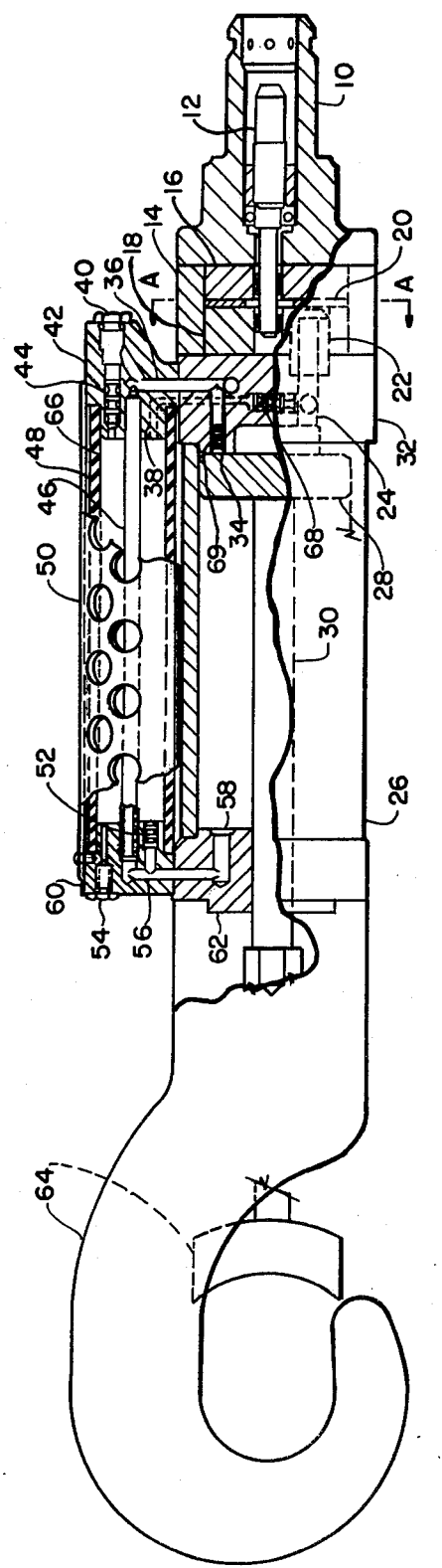
FIG. 1 is a cut away view of the cable cutter principally showing the hydraulic system and the piston drive assembly.

FIG. 1 completely displays the concept of the cable cutter including aspects that are not part of the claims within this patent application. Generally shown is a hook structure which contains an anvil and a cutter blade as item 64. The cutter blade is driven by the transfer of force from a piston rod 30. The piston rod is connected to a piston head 28 which in turn is driven by the hydraulic forces created in the internal cavity of a piston cylinder 26.

Manifolds 32 and 62 are rigidly attached to the ends of piston cylinder 26. Manifold 62 is attached at the cutter end of the cylinder and is constructed with a hole that sealably allows the piston rod to slide through. Manifold 32 is rigidly attached at the other end of the piston cylinder. Manifold 32 is also attached to a gear pump assembly which is composed of an assembly shroud 14, a front bushing 16, a rear bushing 18, and a gear pump mechanism 20.

The gear pump mechanism 20 is mechanically driven by a drive shaft 12. Drive shaft 12 is designed to connect to a fitting on a deep submergence vehicle through a quick disconnect fitting 10. Rotary power from the deep submergence vehicle is transferred to the gear pump mechanism via drive shaft 12.

Manifolds 62 and 32 are fitted with entry/exit ports and fluid passage holes to allow flow of the hydraulic fluid in a preplanned manner during operation of the cable cutter. In manifold 62 a fluid port 58 connected with a fluid passage 56 is provided to allow entry or exit of hydraulic fluid to the portion of the piston cylinder cavity on the piston rod side of piston 28. An auxiliary manifold 60 is fastened to manifold 62 in a manner that fluid passage 56 is aligned between the two manifolds.

At the other end of the piston cylinder manifold 32 is fitted with various fluid ports and passage holes for transmitting the hydraulic fluid during operation. Shown as hidden from view in FIG. 1 is an entry port 24 which connects through an entry-exit port bushing 22 between gear pump mechanism 20 and the cavvity area of the piston cylinder located on the piston face side of piston 28. A second exit port 34 also accesses this region of the piston cylinder cavity. A second auxiliary manifold 42 is fastened to manifold 32 in a manner that fluid passage holes are aligned between the two manifolds.

A fluid passage 38 which connects to fluid port 24 accesses a reservoir cavity area 66. A fluid passage 36 connects with port 34 and with fluid passage 56 located in manifolds 62 and 60. This connection between fluid passage 56 and fluid passage 36 occurs by means of a fluid return line 46 which is connected between manifolds 60 and 42.

Connected to and between the auxiliary manifolds 60 and 42 is a flexible hose 48. This hose creates a reservoir cavity 66 for hydraulic fluid. The flexible hose allows that the internal pressure of the hydraulic fluid will automatically be adjusted to the external hydrostatic pressure of the surrounding environmental medium. Volume compensation will also occur through the action of the environmental hydrostatic pressure upon flexible hose 48.

Fluid passage 36 is also connected to hydraulic fluid cavity 66 through a ball valve 44. Several ball valves and pressure release valves have been installed to aid in the control of the hydraulic fluid during operation of the cutter. In addition to ball valve 44, a ball valve 68 is installed in the fluid passage 38. A pressure release valve 69 is installed at fluid exit port 34. This pressure release valve has a 3,000 psi pressure limit before release occurs. A second pressure release valve 52 is installed in the port connecting fluid passage 56 with hydraulic fluid reservoir 66. This pressure release valve is gauged at 200 psi before release can occur.

Access plugs to reservoir 66 are shown as items 54 and 40. Other details of this hydraulic system are not shown in FIG. 1. For example, there is a connection through a bushing, similar to bushing 22, between fluid passage 36 and gear pump mechanism 20. Such structure is better presented in FIGS. 3 and 4. A safety shield 50 is also shown in FIG. 1 as covering the flexible hose surrounding the fluid reservoir. This safety shield is fastened at both ends to auxiliary manifolds 60 and 42.

Figure 2:
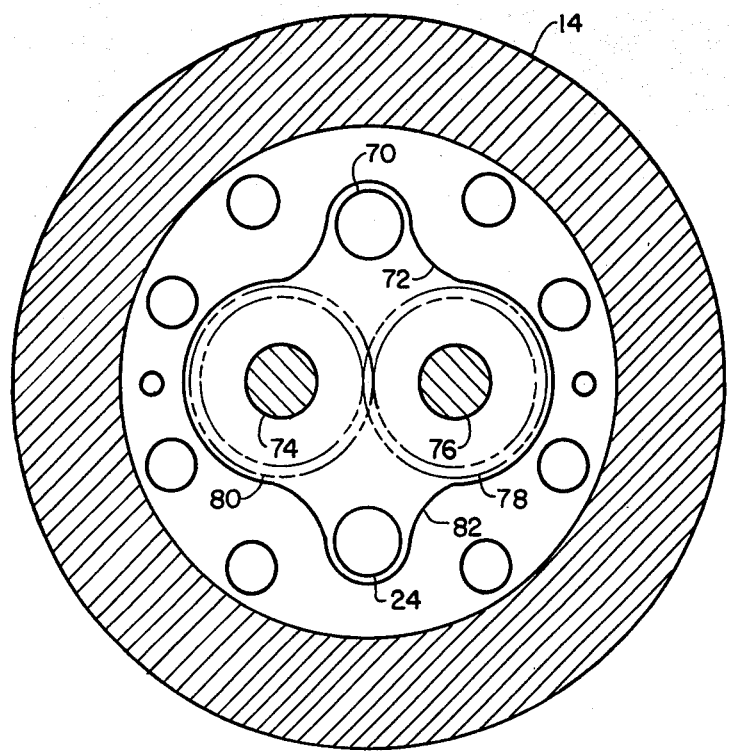
FIG. 2 is a cross section view showing the structure of the gear pump.

FIG. 2 shows a view A—A which is taken as a cross-sectional cut at a plane located just on the surface of the gear pump mechanism. The gear pump assembly shroud 14 is shown surrounding a gear pump housing 72. Two meshing gears 78 and 80 are the key to the fluid pumping system. One of these gears is to be driven by shaft 12 from its connection with the deep submergence vehicle. The other gear is an idler gear which rotates under the driving force of the gear driven by shaft 12. FIG. 2 shows gears 78 and 80 as mounted on two shafts 74 and 76. Clearly one of these shafts will be drive shaft 12.

Fluid entry/exit ports to the gear pump mechanism are shown as port 24 and port 70. The fluid port 24 corresponds with the similarly shown port in FIG. 1. Fluid port 70 was not shown in FIG. 1 to avoid overly complicating the FIG. The hydraulic fluid will either enter or exit through these ports depending upon the direction of rotation of the gears. A close tolerance fitting of gears 78 and 80 within gear pump housing 72 exists.

If the gears are moving the hydraulic fluid towards port 70 then a pressure head is created at port 70 forcing the fluid to flow out of port 70 while simultaneously drawing in fluid through port 24. Reversing rotation of the pump gears reverses the flow of fluid. By this feature it is possible to operate this cable cutter either in a cutting mode where fluid pressure is applied against the piston head to force the cutter against a cable trapped on the anvil for the purpose of cutting the cable, or, in the alternative, to retract the cable cutter from the anvil in preparation of making a second cut. The retraction operation would be accomplished by pumping pressurized fluid into the piston rod side of the piston head within the piston cylinder cavity.

Figure 3:
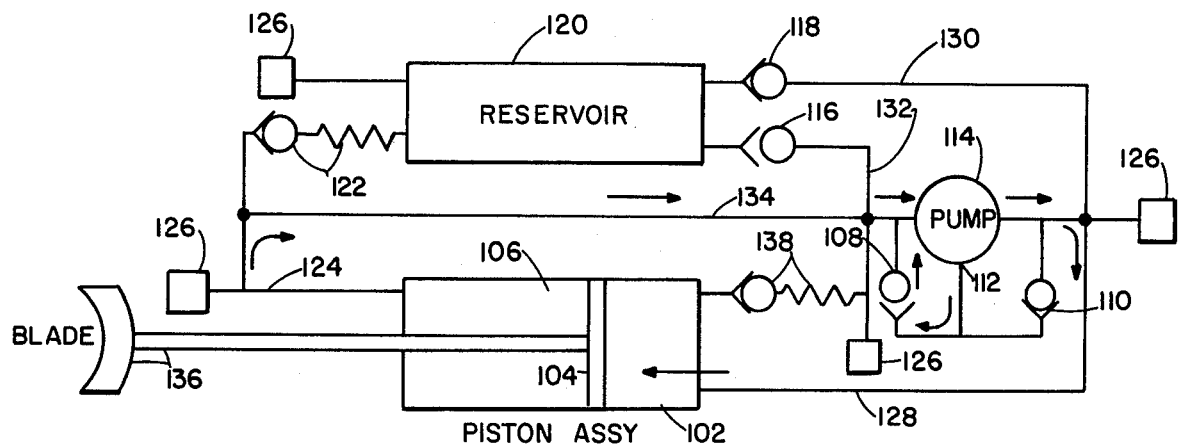
FIG. 3 is a schematic diagram of the hydraulic system which displays the operation during the cutting cycle.
Figure 4:
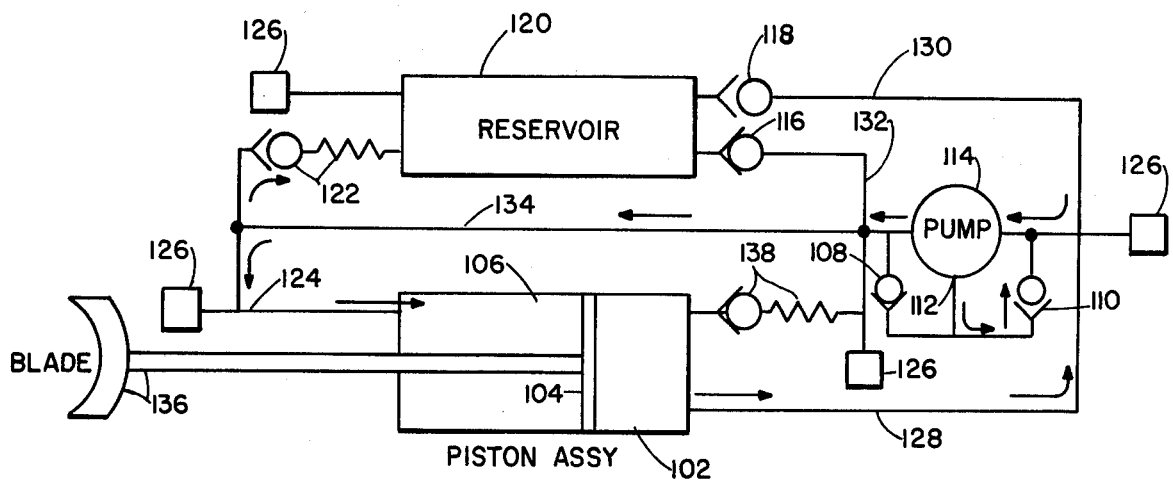
FIG. 4 is another schematic diagram of the hydraulic system displaying operation during the retract cycle of the cutter.

FIGS. 3 and 4 better display in a schematic fashion the fluid flow and the operation of the various hydraulic system components during the two principle operations of the cutter. FIG. 3 displays the operation of fluid pressure being applied upon the face of piston 104 in chamber 102. This operation causes cutter 136 to move against a cable located on an anvil for the purpose of cutting cable. FIG. 4 displays the opposite operation where fluid pressure is created in chamber 106 to operate on the back surface of piston 104 thereby causing cutter blade 136 to retract from the anvil of the cutter.

During the cutting operation depicted in FIG. 3, gear pump 114 forces the fluid through passage 128 into chamber 102 causing the hydrostatic force to act upon the face of cylinder head 104. Any fluid pumped through passage 130 is blocked by ball valve 118.

On the return side of the pump hydraulic fluid in chamber 106 is forced out through passages 124 and 134 to the low pressure side of the pump. Pressure release valve 138 fitted between piston cavity chamber 102 and the low pressure side of pump 114 is structured to open if the pressure in chamber 102 exceeds 3,000 psi. Should this happen, fluid will flow out of chamber 102 through pressure release valve 138 and into the low pressure side of pump 114.

If any pressure builds up in reservoir 120, then fluid may flow out through ball valve 116 and passage 132 to the low pressure side of pump 114 to enter the pumping cycle once again.

Several access plugs 126 are shown attached at various points in the hydraulic circuit. These plugs allow access to bleed the lines and to drain or add hydraulic fluid as necessary. In addition, a circuit around pump 114 is shown for handling any leakage through the pump gear shafts. Such leakage is depicted as flowing through path 112. The leaking fluid will flow through the proper ball valve, in this case a ball valve 108, back into the low pressure side of pump 114. A ball valve 110 on the other side of this loop will block high pressure fluid from passing through.

FIG. 4 depicts the operation of retracting cutter 136 from the cutting surface. During this operation gear pump 114 pumps fluid through the fluid passage 134 and 124 into piston cylinder chamber 106 creating a force against the inner surface of the piston head 104. On the low pressure side hydraulic fluid in chamber 102 escapes through fluid passage 128 and returns to the low pressure side of pump 114. High pressure fluid from pump 114 is blocked from entering reservoir 120 through fluid passage 132 by ball valve 116. However, a pressure release valve 122 will open and allow high pressure hydraulic fluid from the pump to enter the reservoir should the fluid pressure exceed the design setting of 200 psi for this release valve. Fluid within reservoir 120 is free to exit through ball valve 118 and passage 130 to reenter the low pressure side of pump 114. The pressure release valve 138 takes no part during this operation.

Again the leakage circuit for gear pump 114 operates to pick up any leakage fluid escaping through path 112 by allowing it to pump through ball valve 110 back to the low pressure side of pump 114. High pressure fluid from pump 114 is blocked from entering this leakage path by closed ball valve 108. Again, the plugs 126 are shown.

It is to be clearly recognized that in both FIGS. 3 and 4 the walls of reservoir 120, as described earlier, are flexible and in contact with the surrounding environment. Therefore, the hydrostatic pressure of the surrounding environment acts upon these walls and the hydraulic fluid contained with the reservoir. This reaction causes the hydraulic system to be pressure and volume compensated by the environmental hydrostatic pressure around it. Therefore, the system can be designed without concern for fabricating heavy wall components to withstand the high hydrostatic pressures of deep ocean environments. By this concept a lightweight hydraulic system to drive a cable cutter is easily designed to operate at great depths within the world's oceans.

Obviously, many modifications and variations of the present invention are possible in the light of the above teachings. It is therefore to be understood that within the scope of the appenended claims the invention may be practiced otherwise than as specifically described.

What is claimed is:

1. An improved cable cutter for use on an underwater vehicle of the type having a cutting blade which is forcibly driven against an anvil for cutting cables, wherein the improvement:

means for containing a hydraulic fluid in a manner that it is physically separated from a surrounding underwater environment;

means which is hydraulically actuated for forcing the cutting blade against and away from the anvil, said means having a moving connection with the cutting blade;

means including a shaft connected to the containing means and the forcing means for actuating the forcing means by pumping the hydraulic fluid through the forcing means in one direction or the other, said one direction forcing the cutting blade against the anvil and said other direction forcing the cutting blade away from the anvil;

means for connecting the shaft of the actuating means to the underwater vehicle; and means connected with the containing means for compensating the pressure and volume of the hydraulic fluid with the hydrostatic pressure of the surrounding underwater environment.

2. An apparatus according to claim 1 wherein the actuating means comprises:
   a pump.

3. An apparatus according to claim 2 wherein the pump further comprises:
   an internal rotary gear pump operable in either rotary direction; and
   a drive shaft connected to a drive gear of the gear pump and sealably fitted to attach and disconnect with an external rotating power shaft.

4. An apparatus according to claim 3 wherein the compensating means comprises:
   a flexible tube containing the hydraulic fluid within, and said flexible tube in contact with the hydrostatic pressure of the surrounding underwater environment without.

5. An apparatus according to claim 4 wherein the forcing means comprises:
- a piston with a rod connected between it and the cutting blade;
- a cylinder with closed ends containing the piston, one end of said cylinder containing an aperture for allowing the piston rod to sealably slide through and containing a first fluid port connected with one side of the pump, and the other end of said cylinder containing a second fluid port connected with the other side of the pump.

6. An apparatus according to claim 5 wherein the cylinder containing the piston further includes:
- a first manifold attached to a first end of the cylinder and also connected to the rotary gear pump, said first manifold being fitted with at least one port to allow hydraulic fluid to flow between the first end of the cylinder, the gear pump and the containing means; and
- a second manifold attached to the second end of the cylinder, said manifold being fitted with at least one port for allowing hydraulic fluid to flow between the second end of the cylinder, the gear pump and the containing means, said manifold also containing an aperture for sealably and slidably passing the piston rod.

7. An apparatus according to claim 6 wherein the first and second manifolds further include:
- a plurality of hydraulic fluid ports preselectedly fitted with control valves for governing the flow of the hydraulic fluid during cable cutter operations;
- at least one port in the first manifold fitted with a first pressure relief valve set at a first preselected pressure relief value; and
- at least one port in the second manifold fitted with a second pressure relief valve set at a second preselected pressure relief value.

8. An apparatus according to claim 7 wherein the containing means comprises:
- a flexible tube, said flexible tube being the same flexible tube of which the compensating means comprises.

9. An apparatus according to claim 8 wherein the containing means further comprises:
- said flexible tube being connected between the first and second manifolds attached to the ends of the cylinder containing the piston, said connection to said manifolds occurring in a manner that at least one port of each manifold controllably allows entry and exit of hydraulic fluid between the flexible tube, the gear pump and the cylinder.

* * * * *